UNITED STATES PATENT OFFICE 2,325,790

DIALLYL MALEATE AS AN INSECTICIDE

William Moore, Stamford, and Richard O. Roblin, Jr., Old Greenwich, Conn., assignors to American Cyanamid Company, New York, N. Y., a corporation of Maine No Drawing. Application August 30, 1941, Serial No. 408,996

2 Claims. (Cl. 167—22)

The present invention relates to an insecticide and more particularly to a compound which has proven especially effective as a contact poison for the control of insect pests and their eggs.

We have discovered that diallyl maleate possesses powerful insecticidal and ovicidal activity against sucking, soft-bodied and scale insects and their eggs, and that such activity is attained without any substantial harmful or detrimental action on the vegetation infested with the insect.

The following example in which the parts are by weight illustrates a specific method of preparing the above compound.

Example

A mixture consisting of 98 parts of maleic anhydride, 170 parts of allyl alcohol, 200 parts of ethylene dichloride (solvent), 4 parts of d-camphor sulfonic acid (catalyst) and 1 part of bronze powder (polymerization inhibitor) was heated azeotropically at about 120° C. for eleven hours in an apparatus provided with means for separating the water formed during the reaction. After removing the low boiling materials from the resulting product by evaporation under vacuum, 157 parts of diallyl maleate were obtained as a water-white liquid boiling at 91°–92° C. at a pressure of about 1–2 mm. of mercury.

Spray solutions were prepared by dissolving the diallyl maleate in a solvent medium consisting of 65% acetone and 35% water. A 100% control was obtained when a spray of 1–500 dilution was used against the citrus red spider, *Tetranychus citri*. At the same dilution the insecticide gave an 83.8% control on the bean aphid, *Aphis rumicis*.

This new insecticide may be applied in any of the conventional manners. Thus, for example, it may be used in an aqueous emulsion or it may also be incorporated in organic liquids such as the aliphatic and aromatic hydrocarbons for spraying purposes. It may be effectively used in dusts with such inert diluents as kieselguhr, wood flour, walnut shell, talc and the like.

While the invention has been described with particular reference to specific embodiments, it is to be understood that it is not to be limited thereto but is to be construed broadly and restricted solely by the scope of the appended claims.

This is a continuation-in-part of applicant's copending application, Serial No. 356,858, filed September 14, 1940.

We claim:

1. A method of combating sucking, soft-bodied and scale insects and their eggs which include applying thereto a toxic quantity of diallyl maleate.

2. An insecticidal composition containing a toxic quantity of diallyl maleate.

WILLIAM MOORE.
RICHARD O. ROBLIN, Jr.